(12) United States Patent
Auber

(10) Patent No.: US 6,848,689 B2
(45) Date of Patent: Feb. 1, 2005

(54) SHAFT SEAL

(75) Inventor: Philippe Jacques Auber, Le Havre (FR)

(73) Assignee: Dresser-Rand Company, Olean, NY (US)

(*) Notice: Subject to any disclaimer, the term of this patent is extended or adjusted under 35 U.S.C. 154(b) by 0 days.

(21) Appl. No.: 09/957,525

(22) Filed: Sep. 20, 2001

(65) Prior Publication Data

US 2002/0070505 A1 Jun. 13, 2002

Related U.S. Application Data

(63) Continuation of application No. PCT/EP00/02445, filed on Mar. 20, 2000.

(30) Foreign Application Priority Data

Mar. 22, 1999 (EP) .............................. 99400690

(51) Int. Cl.[7] .............................. F16J 15/34
(52) U.S. Cl. .................. 277/377; 277/358; 277/367
(58) Field of Search ............... 277/358, 367, 277/369, 370, 374, 375, 377, 390, 393

(56) References Cited

U.S. PATENT DOCUMENTS

| | | | | |
|---|---|---|---|---|
| 4,294,453 A | * | 10/1981 | Inouye et al. ............... | 277/348 |
| 4,332,391 A | * | 6/1982 | Arnold ....................... | 277/370 |
| 4,427,204 A | * | 1/1984 | Alley ......................... | 277/372 |
| 5,092,612 A | * | 3/1992 | Victor et al. ................ | 277/400 |
| 5,137,284 A | * | 8/1992 | Holder ....................... | 277/390 |
| 5,172,918 A | * | 12/1992 | Pecht et al. ................. | 277/400 |
| 5,199,172 A | | 4/1993 | Runowski | |
| 5,370,403 A | * | 12/1994 | Sedy .......................... | 277/390 |
| 5,443,274 A | * | 8/1995 | Fuse .......................... | 277/390 |
| 5,490,679 A | * | 2/1996 | Borrino et al. ............. | 277/369 |
| 5,505,465 A | * | 4/1996 | Hornsby ..................... | 277/374 |
| 5,509,668 A | * | 4/1996 | Kurita et al. ............... | 277/390 |
| 5,533,739 A | * | 7/1996 | Sedy .......................... | 277/390 |
| 5,558,342 A | | 9/1996 | Sedy | |
| 5,560,622 A | * | 10/1996 | Sedy .......................... | 277/390 |
| 5,901,965 A | * | 5/1999 | Ringer et al. ............... | 277/361 |
| 5,954,341 A | * | 9/1999 | Ringer et al. ............... | 277/361 |
| 6,131,913 A | * | 10/2000 | Auber et al. ................ | 277/372 |
| 6,135,458 A | * | 10/2000 | Fuse .......................... | 277/382 |
| 6,152,452 A | * | 11/2000 | Wang ......................... | 277/399 |
| 6,182,971 B1 | * | 2/2001 | Parker et al. ............... | 277/348 |
| 6,425,583 B1 | * | 7/2002 | Muraki ....................... | 277/358 |

FOREIGN PATENT DOCUMENTS

| | | |
|---|---|---|
| DE | 39 42 408 A1 | 11/1989 |
| EP | 0 568 192 A1 | 11/1993 |
| WO | WO 96/15397 | 5/1996 |

* cited by examiner

*Primary Examiner*—William L. Miller
(74) *Attorney, Agent, or Firm*—Michael Best & Friedrich LLP

(57) ABSTRACT

A shaft seal in which a rotary sealing part is mounted coaxially with the sealing element and forms therewith a contactless primary seal between opposed faces of the sealing element and rotary sealing part to substantially prevent fluid flow across the primary seal from a high pressure radial side to a low-pressure radial side. An auxiliary sleeve forms a small gap between it and a seal housing and maintains the gap despite the presence of relatively high pressure at the high pressure radial side.

26 Claims, 6 Drawing Sheets

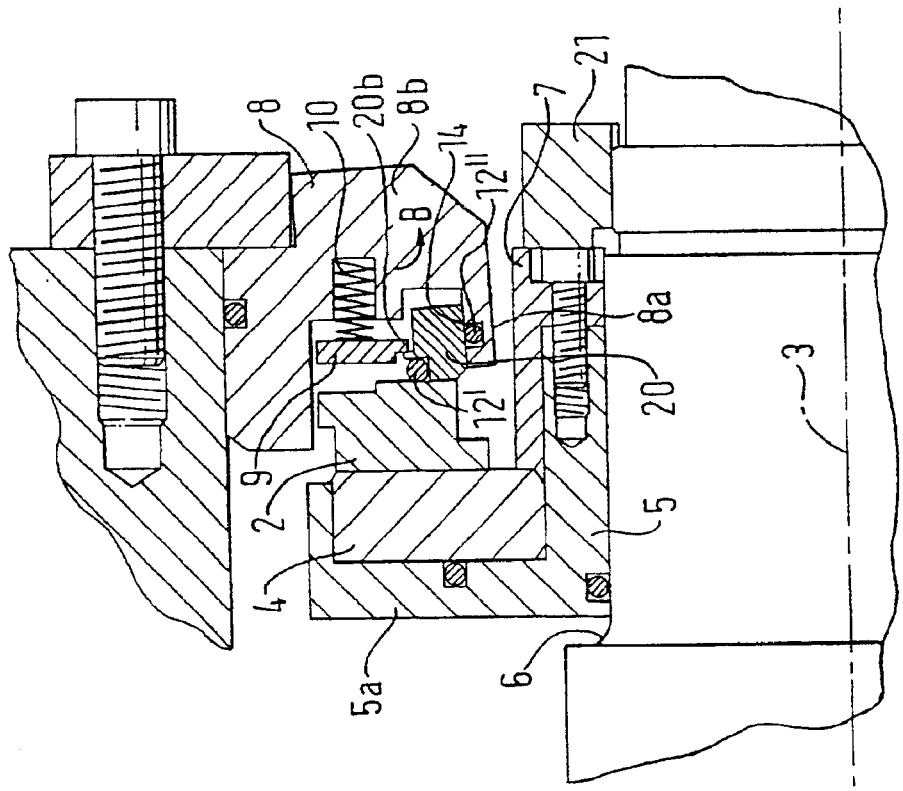
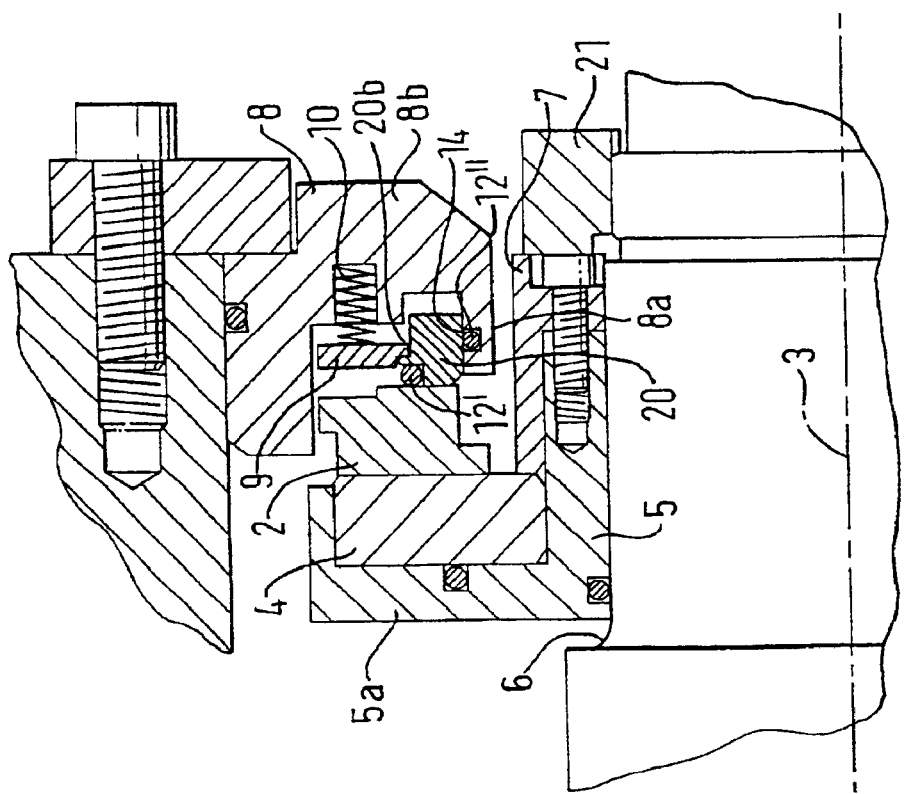

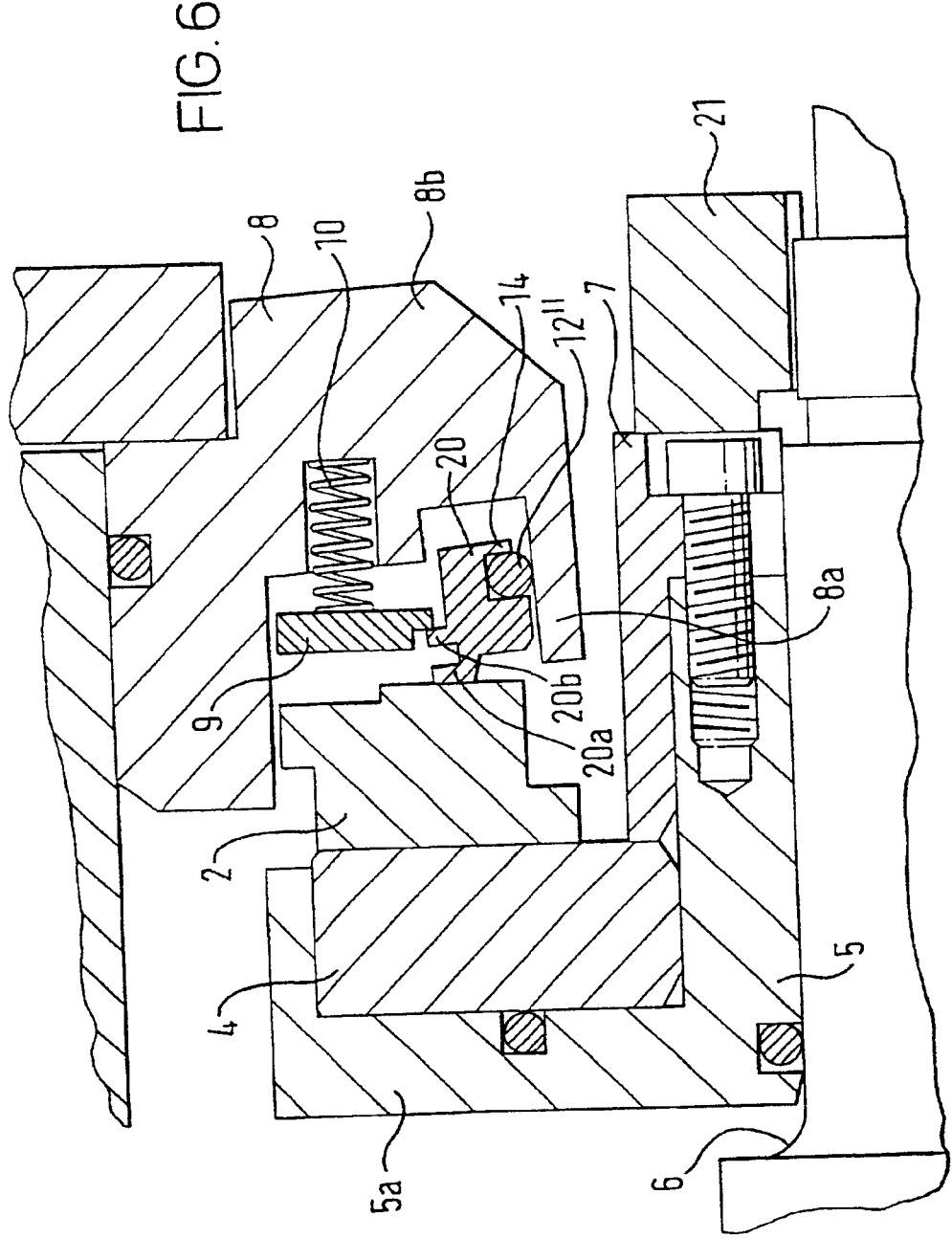

SHAFT SEAL

This application is a continuation of international application No. PCT EP00/02445, filed Mar. 20, 2000.

BACKGROUND OF THE INVENTION

The invention relates to a shaft seal for rotating shafts in turbo-machines or other pressurized machine. In particular, the present invention, in common with a known form of shaft seal, provides a shaft seal comprising a sealing element, a rotary sealing part mounted coaxially with the sealing element and forming therewith a contactless primary seal between opposed faces of the sealing element and rotary sealing part to substantially prevent fluid flow across the primary seal from a high pressure radial side to a low-pressure radial side, a seal housing, an annular pusher disc disposed about a forwardly extending sleeve portion of the seal housing and coaxially with the sealing element, biasing means acting on the pusher disc to urge the sealing element axially towards the rotary sealing part, and a first sealing member disposed between the pusher disc and the forwardly extending sleeve portion in communication with the high-pressure radial side to provide a secondary seal between the high-pressure and low-pressure radial sides.

Non-contacting shaft seals are often used with machinery for the compression or expansion of gas (hydrogen, natural gas, air, etc.) where the transmission of gas along the shaft needs to be prevented. Due to the high-pressure, high-speed machinery which is normally used, the shaft seals are chosen to be of non-contact type, in order to reduce heat build up in the seals and the wear of the sealing parts and/or in order to avoid the complexity of oil seals and their associated systems.

Non-contacting operation avoids this undesirable face contact when the shaft is rotating above a certain minimum speed, which is often called a lift-off speed.

Non-contacting shaft seals provide advantages over seals where the sealing surfaces contact one another, due to reduction in wear and the lower heat generation. Articles entitled "Fundamentals of Spiral Groove Non-contacting Face Seals" by Gabriel, Ralph P. (Journal of American Society of Lubrication Engineers Volume 35, 7, pages 367–375), and "Improved Performance of Film-Riding Gas Seals Through Enhancement of Hydrodynamic Effects" by Sedy, Joseph (Transaction of the American Society of Lubrication Engineers, Volume 23, 1 pages 35–44) describe non-contacting seal technology and design criteria and are incorporated herein by reference.

As with ordinary mechanical seals, a non-contacting face seal consists of two principal sealing elements. At least one of the sealing elements is provided with shallow surface recesses.

These recesses are taper-shaped perpendicular to and concentric with the axis of rotation, the tapering being in the direction opposite to the direction of rotation of the shaft. In known contactless face seals, both sealing elements, in the form of rings, are positioned adjacent to each other with the sealing surfaces in contact at conditions of zero pressure differential and zero speed of rotation. One of the rings is normally fixed to the rotatable shaft by means of a shaft sleeve, the other being located within the seal housing structure and allowed to move axially. The shaft seal is designed to enable axial movement of the sealing ring and yet prevent or substantially minimize leakage of the sealed fluid. For this reason, a sealing member is placed between the ring and the housing.

As mentioned above, to achieve non-contacting operation of the seal, one of the two sealing surfaces is provided with shallow surface recesses, which act to generate pressure fields that force the two sealing surfaces apart. When the magnitude of the forces resulting from these pressure fields is large enough to overcome the forces that urge the seal faces closed, the sealing surfaces will separate and form a clearance, resulting in non-contacting operation.

As explained in detail in the above-referenced articles, the character of the separation forces is such that their magnitude decreases with the increase of face separation. Opposing or closing forces, on the other hand, depend on sealed pressure level and as such are independent of face separation. They result from the sealed pressure and the spring force acting on the back surface of the axially movable sealing ring. Since the separation or opening force depends on the separation distance between sealing surfaces, during the operation of the seal or on imposition of sufficient pressure, differential equilibrium separation between both surfaces will establish itself. This occurs when closing and opening forces are in equilibrium and equal to each other. Equilibrium separation constantly changes within the range of gaps. The goal is to have the low limit of this range above zero. Another goal is to make this range as narrow as possible, because on its high end the separation between the faces will lead to increased seal leakage. Since non-contacting seals operate by definition with a clearance between sealing surfaces, their leakage will be higher than that of a contacting seal of similar geometry. Yet, the absence of contact will mean zero wear on the sealing surfaces and therefore a relatively low amount of heat generated between them. It is this low generated heat and lack of wear that enables the application of non-contacting seals to high-speed turbo machinery and other pressure machines, where the sealed fluid is gas. Turbo compressors are used to compress this fluid and since gas has a relatively low mass, they normally operate at very high speeds and with a number of compression stages in series.

As explained in the above-referenced articles, the effectiveness of the seal is largely dependent upon the so-called balance diameter of the seal. This is also true for contact seals.

When pressure is applied from the outside diameter of the seal, reduction of the balance diameter results in a greater force pushing the two sealing faces together and so a smaller gap between the faces. Thus, less gas is leaked from the system.

Known compressors have been used for compressing gas at inlet pressures of some 200 bar to delivery pressures of some 500 bar. Contactless shaft seals of the kind described above are typically used to seal against the compressor inlet pressure. The trend in compressor requirements nowadays is towards higher inlet and delivery pressures. However, such pressure levels give rise to a problem with the contactless shaft seals described above, as is now explained with reference to FIGS. 1, 1a.

FIG. 1 is a partial longitudinal sectional view through the shaft seal showing the relevant structural elements of a known non-contacting shaft seal of the type described above. The shaft seal is incorporated in a turbo-machine (not shown), such as a compressor in this example. There is shown a shaft seal 1 having a (non-rotating) sealing element or ring 2 mounted coaxially with the shaft axis (denoted by reference numeral 3), and a rotary sealing part or ring 4 located coaxially with the sealing ring 2, and therefore also with the shaft axis 3. It will be appreciated that the vertical sectional view of FIG. 1, for simplicity, shows only the portion of the shaft seal located above the shaft axis. The sealing ring 4 is mounted on an inner sleeve 5 having a radial flange 5a against which the sealing ring 4 abuts, the sleeve 5 being mounted on the shaft 6 such that the shaft 6, inner sleeve 5 and rotary sealing ring 4 co-rotate as a single rotary element. In addition, a locating sleeve 7 is bolted to inner sleeve 5. The assembly comprising components 4, 5 and 7 is prevented from displacement in one axial direction by a locating ring 21 and in the opposite axial direction by the high pressure acting inside the compressor.

The shaft seal also has a seal housing 8 and an annular pusher disc 9 disposed between a radially inward flange portion 8b of the seal housing 8 and sealing ring 2 and loosely fitted around a forwardly extending sleeve portion 8a of the seal housing. A plurality of biasing springs (one of which, 10, is shown in FIG. 1), located at the same axial position in respective blind holes 11 in radially inward flange 8b and distributed about the shaft axis, act against the pusher disc 9 to urge it against the sealing ring 2. The (non-rotary) sealing ring 2 and rotary sealing ring 4 together form a contactless primary seal when the turbo-machine (or pressurized machine) is in operation, which substantially prevents fluid flow between the sealing faces of the primary seal, from the high pressure radially outer side to the low pressure radially inner side. The sealing face of sealing ring 2 has shallow grooves cut into its front surface to generate the required separation between the sealing faces of sealing rings 2, 4. Alternatively, the grooves could be formed in the rotary sealing ring 4.

Preferred designs for the grooves are given in more detail in Publish International Application WO-A-96/15397 of Dresser-Rand Company and the preferred designs for the groove are incorporated herein by reference. The sealing element 2 is normally made from carbon or other suitable material.

As shown in FIG. 1, the sealing element 2 is afforded limited axial movement against the biasing force of the springs 10. These springs provide a relatively small net biasing force so that when the shaft is rotating at normal speed, the generated separating forces cause the sealing ring 4 to separate from the sealing ring 2. The gap between these rings adjusts itself such that the generated opening forces on the one hand and the sum of the generated closing forces and the spring biasing force on the other hand are equal to one another. However, when the shaft is at rest the springs act to move the sealing ring 2 into contact with the rotary sealing ring 4.

A high-pressure gas is supplied to the radially outer edge of the seal rings 2, 4. Normally, this gas would be derived from the working fluid of the machine. However, it could instead be a clean gas suitable for venting into the atmosphere. In that event, the vented gas can be a combustible gas which is piped to burn (flare).

The high pressure at the high-pressure radial side acts around the rear face of sealing element 2 down to a so-called equilibrium balance diameter. Located in a stepped recess 14 formed in the front face of the pusher disc 9 adjacent its inner circumference is a secondary seal 12 which seals against both the seal ring 2 and the forwardly extending sleeve portion 8a of housing 8. This secondary seal serves to prevent the high pressure venting around the rear face of sealing element 2 or behind the pusher disc 9 to the low-pressure radial side (atmospheric pressure). The balance diameter is determined essentially by the contact line of secondary seal 12 with the forwardly extending sleeve portion 8a of housing 8. The secondary seal 12 can be of any suitable form, such as a conventional O-ring, as shown, or a spring-energised U-seal. Other forms of seal are possible and the precise form selected is not material.

In use of the shaft seal 1, the high-pressure working fluid of the compressor is admitted to the high-pressure radial side of the primary seal. This pressure acts on the front face of the pusher disc 9 down to the circular line of sealing of the secondary seal 12 against the sealing ring 2. The high-pressure fluid also acts against the rear face of pusher disc 9 down to the balance diameter. The secondary seal 12 seals the applied high-pressure from the low-pressure radial side, which is at atmospheric pressure where a single shaft seal is used or, if multiple shaft seals are provided in cascade, at a lower pressure than the pressure to be sealed. Because of the pressure differential acting on the rear face of pusher disc 9 down to the balance diameter, there is a net closing force (to the left in FIG. 1) acting on the pusher disc 9 against the sealing ring 2 at all times. This closing force is supplemented by the action of the biasing springs 10, and these closing forces are applied in the closing direction against sealing ring 2. In addition, the high pressure fluid acting on the front faces of sealing ring 2 produces an opening force, while the high pressure fluid acting on the rear faces down to the sealing diameter of secondary seal 12 produces a closing force. Still further, the taper-shaped surface recesses or grooves cut in the front face of sealing ring 2 (or rear face of sealing ring 4) generate separating pressure fields acting between the sealing rings 2, 4, the magnitude of the pressure fields depending on the rotational speed of the compressor shaft. The high pressure to be sealed, the depths of the recesses or grooves and the size of the gap between the sealing rings 2, 4 also influence the magnitude of the pressure fields. Whether the sealing rings 2, 4 of the shaft seal are in contact or separated depends on the magnitudes of the generated opening and closing forces, and the net spring biasing force.

When the compressor is started up, as the rotational speed of the shaft 6 initially starts to build up, the primary seal maintains a substantially fluid-tight seal between the high-pressure and low-pressure radial sides, by virtue of sealing contact between the sealing rings 2, 4. Under these conditions, the net separating force generated by the primary seal is insufficient to overcome the sum of the spring biasing forces and the net closing force acting on the primary seal due to the applied high-pressure.

However, when the compressor shaft speed reaches a sufficient value such that the applied fluid pressure is adequate to generate a separating force that overcomes the net closing force acting on the sealing ring 2, this sealing ring will start to move away from the sealing ring 4 into an equilibrium position in which it maintains a contactless seal between the rotating sealing ring 2 and the non-rotating sealing ring 4. As described above, the secondary seal 12 functions at all times to prevent leakage of high-pressure fluid past the rear face of sealing ring 2 and the pusher disc 9.

Shaft seals of the type described above with reference to FIG. 1 operate satisfactorily at typical sealing pressures of compressors that have been manufactured in the past. Typically, such compressors have been manufactured for compressing gases at pressures of typically from about 200 bar to about 500 bar. However, the industry is now demanding compressors to compress gas from 300 bar or more to 800 bar or more. On the other hand, it has been found that existing shaft seal designs are not adequate to withstand such inlet-pressure values, for the reasons now to be described with reference to FIG. 1a.

This Figure shows, in deliberately exaggerated manner for the purposes of illustration, the effect of operating under such high-pressure values. As shown in the Figure, the high-pressure acting on the outer face of the forwardly extending sleeve portion 8a of the housing 8 between the seal 12 and the junction with the flange portion 8b deforms the flange portion inwardly with a deflection increasing with increasing axial distance in the axial direction away from the flange portion. This torsional deformation is indicated by letter A in FIG. 1a. Correspondingly, the high pressure acting against the inside (front) face of radial flange portion 8b torsionally deforms that flange rearwardly, as indicated by arrow B. The consequence is that, as shown in FIGS. 1a, 2a, the very small gap normally existing between the inner face of the sealing ring 2 and the outer face of the forwardly extending sleeve portion 8a of the housing 8 is enlarged. With increasing high-pressure acting against the secondary seal 12 and widening of the gap between the sealing ring 2 and the forwardly extending sleeve portion 8a, a bead (not shown) starts to form as the secondary seal 12 starts to be extruded through the widening gap. When there is no such bead on the secondary seal 12, this seal offers little frictional resistance to the rearward axial sliding of the pusher disc 9. However, when the bead (not shown) starts to form, the frictional resistance increases, potentially significantly and even to the point where the pusher disc can become united with the forwardly extending sleeve portion 8a. Furthermore, as the bead (not shown) continues to grow, an increasingly unstable situation can develop whereby the sealing ability of the secondary seal 12 is progressively lessened due to the continuing extrusion, until eventually an unstable situation is reached in which the seal 12 is expelled or blown out through the gap, resulting in failure of the shaft seal. It is noted that the bead (not shown) does not normally form around the entire rear circumferential region of the secondary seal 12 but generally only at a single angular position about the seal circumference.

One possible solution to this problem that has been considered is to minimise the gap existing between the sealing ring 2 and the pusher disc 9 when the shaft seal is not in use, but there is a limit to how much this gap can be reduced because the pusher disc 9 must be free to undergo limited axial movement when the shaft seal is not in operation. Furthermore, radially inward deflection of the sleeve portion 8a is inevitable, yet this sleeve must not be allowed to come into contact with the (rotating) shaft inner sleeve 7 under full operating pressure.

Another potential solution which has been considered is to use harder materials for forming the sealing parts of the secondary seal 12. However, there is a limit to how hard the selected materials can be, particularly since harder materials are less effective to provide the required sealing effect and they also increase the friction forces generated.

Spring energised polymer seals have been proposed. However, the operating pressure at which beads start to form on such seals is about 200–250 bar.

BRIEF SUMMARY OF THE INVENTION

The present invention seeks to provide a shaft seal which is improved in the above respects and can withstand high operating pressures, in the range from zero bar to 300 bar or more. It relates to a shaft seal as initially defined and is characterised by an auxiliary sleeve which is disposed around the sleeve portion coaxially therewith and against which the pusher disc is biased by the action of the biasing means, the auxiliary sleeve being maintained in sealing contact with the sleeve portion by the first sealing member, and in sealing contact with the sealing element.

Because the fluid high-pressure acting on the auxiliary sleeve produces a net radially inwards force, it can be arranged that the small gap existing between the auxiliary sleeve and the forwardly extending sleeve portion of the machine housing when no fluid pressure is applied to the shaft seal will not enlarge to the extent that occurs in the prior art shaft seals disclosed with reference to FIGS. 1, 1a. Therefore, there is a reduced tendency for appreciable frictional resistance to develop between the first sealing member and the forwardly extending sleeve portion, or for the first sealing member to be expelled under high-pressure operation.

Ideally, the geometry, material and design of the auxiliary sleeve is such that the distortion of the auxiliary sleeve substantially matches that of the forwardly extending sleeve portion under fluid pressure, so that the gap between these two elements remains substantially the same irrespective of the fluid pressure acting, thereby avoiding or minimising the risk of a bead forming on the first sealing member.

The seal between the auxiliary sleeve and the sealing element can be by direct contact between those two components. In this embodiment, preferably a lip is formed on the auxiliary sleeve to provide sealing contact with the sealing element. Because no separate seal is provided, constructional simplicity and lower cost can be obtained.

Preferably, said first sealing member is located in a channel formed in the forwardly extending sleeve portion of the seal housing. Alternatively, said channel in which said first sealing member is located may be formed in the auxiliary sleeve. Preferably, the biasing means acts between a flange portion of said housing and the pusher disc.

The shaft seal may be incorporated in a turbo-machine or other pressurized machine, though for convenience the description which follows relates to the specific case of a compressor, as in the prior art examples described with reference to FIGS. 1, 1a.

BRIEF DESCRIPTION OF THE SEVERAL VIEWS OF THE DRAWINGS

For a better understanding of the invention and to show how the same may be carried into effect, reference will now be made, by way of example, to the accompanying drawings in which:

FIGS. 4, 4a are corresponding views to FIGS. 2, 2a, respectively, of a second embodiment of the invention; and FIGS. 5 and 6 are views on an enlarged scale, corresponding to FIG. 2a, of third and fourth embodiments, respectively.

DETAILED DESCRIPTION OF THE INVENTION

Figure 1:
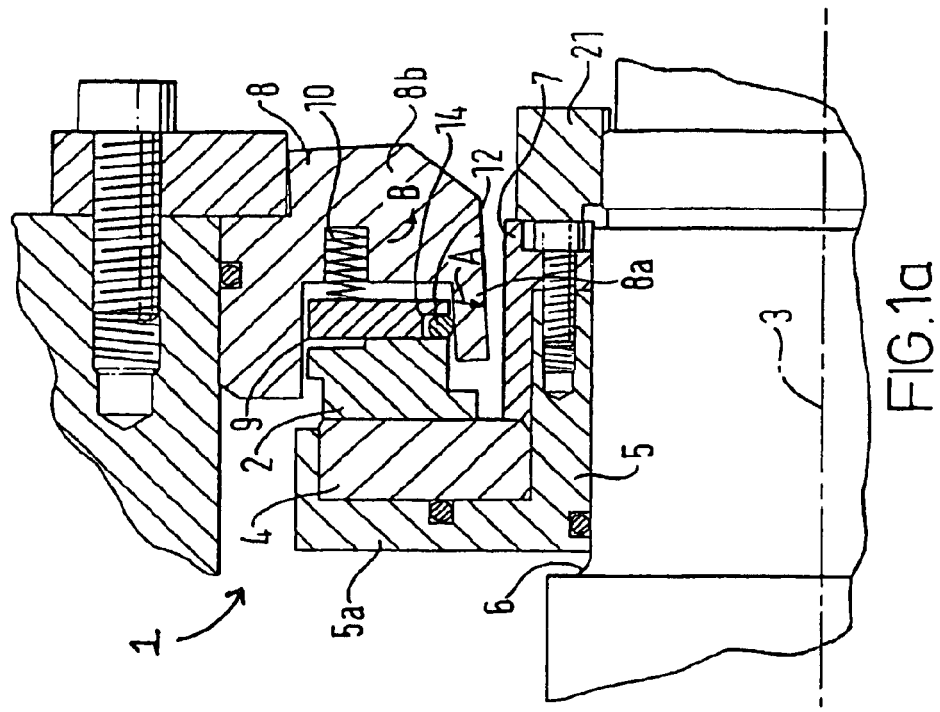
FIG. 1 is a partial longitudinal sectional view through a first known shaft seal showing the relevant structural elements of the seal.
Figure 1A:
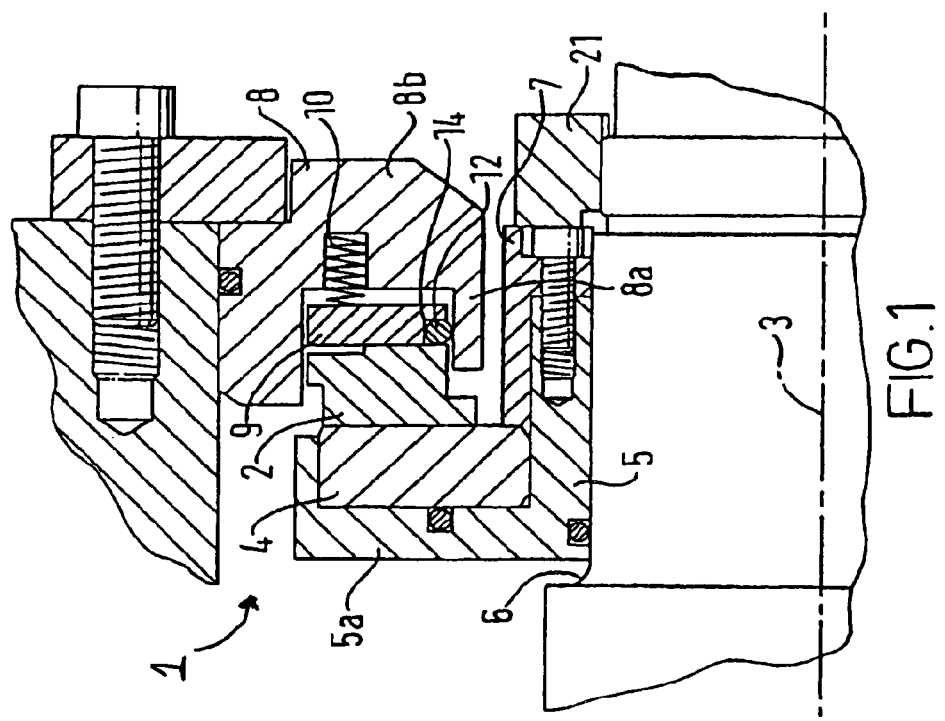
FIG. 1a is a corresponding view, showing the distortion of certain structural elements in an exaggerated manner for illustrative purposes.
Figure 2:
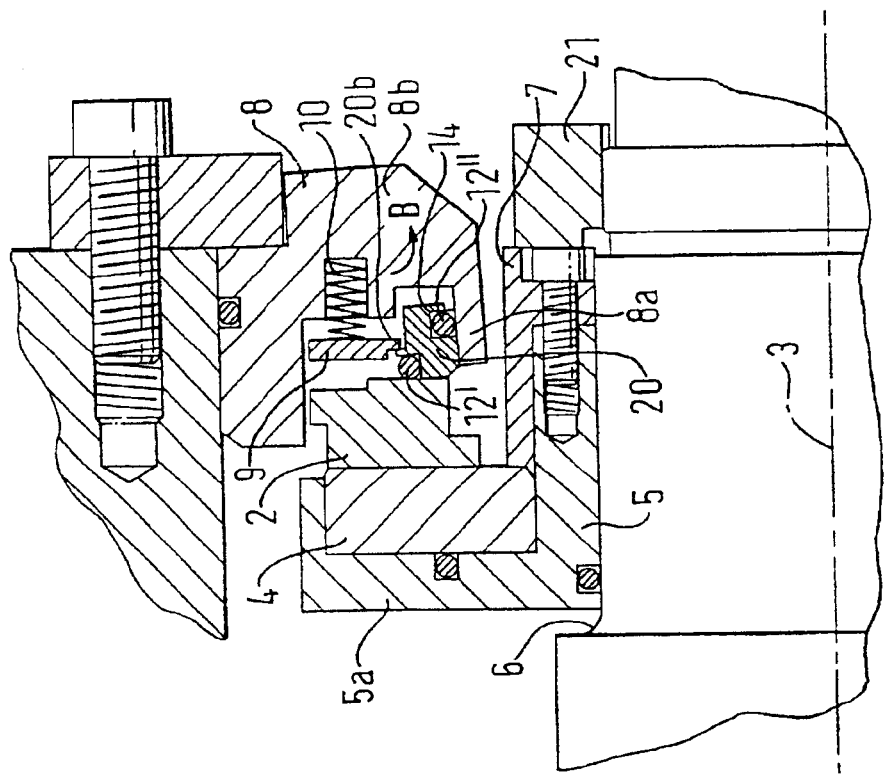
FIGS. 2, 2a are corresponding views to FIGS. 1, 1a, respectively, of a first embodiment of the invention.
Figure 2A:
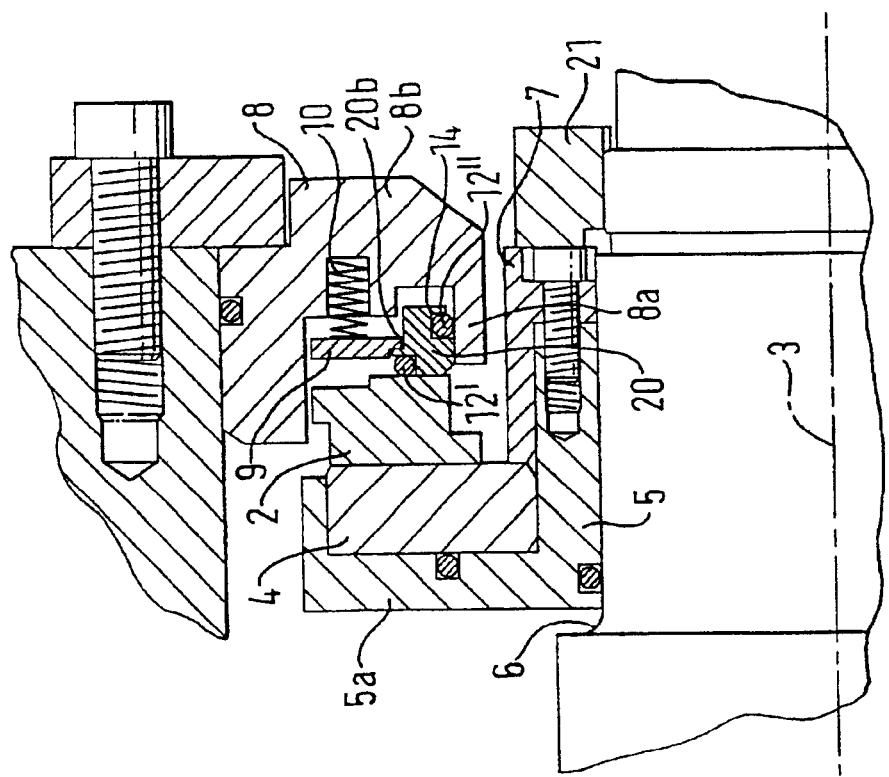

The shaft seal illustrated in FIGS. 2, 2a is identical to that described above with reference to FIGS. 1, 1a, except in the respects described below. To the extent that the construction is the same, this is indicated by the use of identical reference numerals.

The shaft seal 1 additionally comprises an auxiliary sleeve (or ring) 20 disposed around the sleeve portion 8a co-axially therewith, with a small gap radially separating the two elements 8a, 20. The auxiliary sleeve includes a radial flange 20b on its outer face, against which the pusher disc is pressed by the biasing springs 10. In this embodiment, the combined sealing functions of the single secondary seal in the shaft seal of FIGS. 1, 1a is provided by a secondary seal 12', located in a stepped recess in front of outer flange 20b and sealing against the rear face of sealing ring 2, and by a further secondary seal 12", located in a channel formed in the inside surface of the auxiliary sleeve 20 and acting against the outer surface of sleeve portion 8a of housing 8. The seals 12', 12" can be of any suitable form, such as a spring energised Y-seal, an O-ring 16', or a spring energised U-seal or Y-seal.

Figure 3:
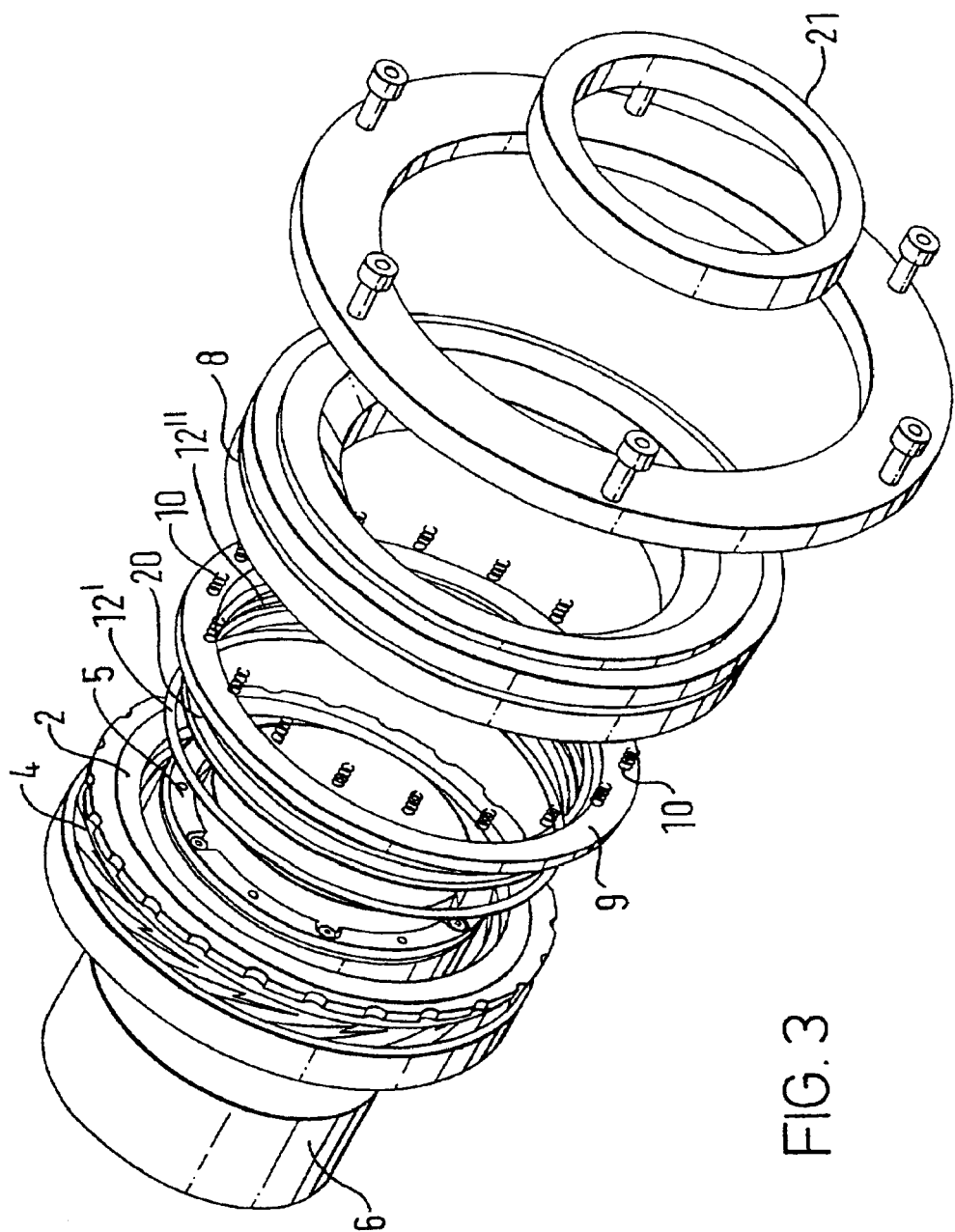
FIG. 3 is an exploded view of the shaft seal according to the first embodiment.

FIG. 3 is an exploded view of the shaft seal, giving a clear indication of the geometry of the respective elements of the shaft seal.

In use of the shaft seal, the high pressure fluid acting at the high-pressure fluid side of the primary seal acts, just as in the case of the known shaft seals according to FIGS. 1, 1a, against the pusher disc 9 to cause the forwardly extending sleeve portion 8a to deflect radially inwardly. The distortion of the forwardly extending sleeve portion is progressive from the junction of the forwardly extending sleeve portion 8a with the flange portion 8b, because of the pressure differential between the inside and outside pressures acting on main portion 8a. The flange portion 8b substantially resists distortion of the sleeve portion 8a in the region of that end. The maximum inward radial distortion occurs at the other (front) end.

However, in the present embodiment, as shown in FIG. 2a, the high fluid pressure acting on the auxiliary sleeve 20, in particular around its external surface, similarly inwardly distorts the auxiliary sleeve 20 at its front. Therefore, the small gap existing between the outer surface of the sleeve portion 8a and the inner surface of the auxiliary sleeve 20 does not change much, thereby avoiding or at least minimising the possibility of the high-pressure acting on the secondary seal 12" from causing the seal to be extruded into the gap. Furthermore, seal 12' maintains an adequate seal between the front face of the auxiliary sleeve 20 and the rear face of sealing spring 2. Therefore, even when operating under higher pressures e.g. upwards of 300 bar, the secondary seal 12" will not start to offer high frictional resistance to the sliding action of the pusher sleeve, nor be expelled or blown out of the recess 14 in the pusher disc 9.

It is preferred to design the auxiliary sleeve 20 such that the gap between it and the forwardly extending sleeve portion 8a remains substantially constant irrespective of the pressure which is acting at the high pressure radial side. This result can be achieved by appropriate choice of the geometry and relative dimensions of the auxiliary sleeve 20 and forwardly extending sleeve portion 8a, and by suitable choice of the materials from which these two components are made. Preferably, the radial and toroidal stiffnesses of the auxiliary sleeve 20 are the same as those of the sleeve portion 8a. It is also preferred that the materials from which the auxiliary sleeve 20 and housing 8, in particular the sleeve portion 8a, are made are the same, so that the gap between those two components remains substantially invariant, irrespective of temperature changes.

The embodiment according to FIGS. 4, 4a shows one possible modification, which merely involves accommodating the secondary sealing member 12" in a channel 14 formed in the sleeve portion 8a, rather than in the auxiliary sleeve 20.

In the described embodiments, the secondary seal 12' provides a substantially fluid-tight seal between the sealing ring 2 and the auxiliary sleeve 20. However, in the embodiment of FIG. 5, no such seal is provided as a separate sealing member. Rather, there is direct contact between a plain lip 20a formed on the auxiliary sleeve 20 and the rear face of sealing ring 2. This results in a constructional simplification, and hence lower cost.

In the modification of FIG. 6, the lip 20a projects outwardly from the auxiliary sleeve. In this way, it is able to flex slightly, elastically. This "soft" lip arrangement can improve the quality of the seal between the auxiliary sleeve and sealing ring 2, as compared with the embodiment of FIG. 4.

Figure 5:
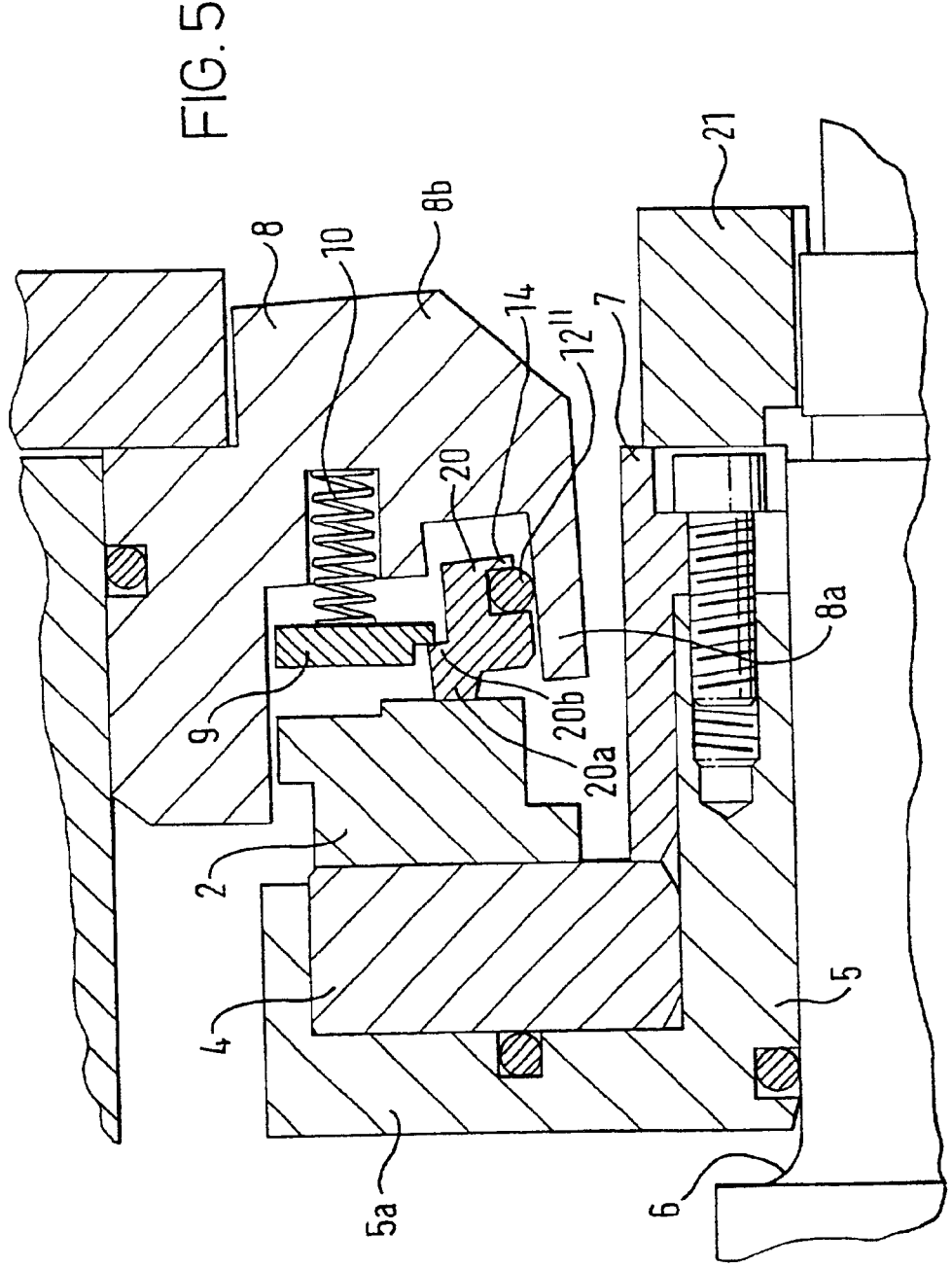

In the case of the contactless shaft seals according to FIGS. 5 and 6, it is possible to form channel 14 in the sleeve portion 8a, rather than in the auxiliary sleeve 20, just as in the case of the FIGS. 4, 4a embodiment.

As an alternative to the biasing springs 10, a wave spring for example in the form of a single annulus of suitable sheet material, e.g. metal, (or several stacked together) may be deformed so as to form successive undulations at different angular positions about the axis of the annulus. The deformed annulus is compressed between the pusher disc 9 and the flange portion 8b of the housing 8, thereby providing the required biasing action in the manner of a leaf spring.

In the described embodiments, the source of the high-pressure fluid is the working fluid of the compressor, whose pressure accordingly increases with increasing compressor operating speed. Where a separate source of high-pressure fluid from the working fluid is used, its pressure will normally be held at a given delivery pressure. When the compressor is at rest, the net force acting on the primary seal is preferably a closing force, maintaining the sealing ring 2 against the sealing ring 4. However, when the compressor has speeded up sufficiently, the separating force generated by the tapered grooves or recesses in the one sealing ring or the other of the primary seal is sufficient to separate the two rings.

Therefore, the operation is essentially the same as in the case where the working fluid of the compressor is the source of the high-pressure fluid. Although it is preferred in this embodiment that the sealing ring 2 is held against the sealing ring 4 when the compressor is at rest, it is possible for the shaft seal to be slightly open under rest conditions, since the essential requirement is merely that the shaft seal provides contactless operation when the compressor is operating at normal operational speed.

What is claimed is:

1. A sealing system for a shaft comprising:
    a stationary sealing ring extending around the shaft in a coaxial relationship to the shaft;
    a rotary sealing ring extending around the shaft in a coaxial relationship to the shaft;
    a housing;
    a sleeve disposed between the stationary sealing ring and the housing;
    a pusher disposed between the sleeve and the housing;
    biasing means urging the pusher away from the housing and against the sleeve to urge the sleeve against the stationary ring and to urge the stationary ring against the rotary ring so that facing surfaces of the rings engage to form a primary seal between the rings to substantially prevent fluid flow across the primary seal from a relatively high pressure radial side to a relatively low pressure radial side;

a sealing member disposed between two facing surfaces of the housing and the sleeve to maintain a sealing contact between the housing and the sleeve; and a gap formed between the two facing surfaces and in a spaced relation to the sealing member, the gap being maintained despite the presence of relatively high pressure at the high pressure radial side.

2. The system of claim 1 wherein the geometry and the relative dimensions of the housing and the sleeve are such that the sleeve is adapted to maintain the gap between it and the housing despite the presence of relatively high pressure at the high pressure radial side.

3. The system of claim 1 wherein the sealing member is disposed in a channel of the sleeve that extends through the surface of the sleeve.

4. The system of claim 1 wherein the sealing member is disposed in a channel in the housing that extends through the surface of the housing.

5. The system of claim 1 wherein the sleeve and the housing are fabricated of the same material.

6. A shaft according to claim 1 wherein the sleeve engages the stationary ring.

7. The system of claim 1 wherein the sleeve has a lip that engages the stationary ring and flexes in response to the presence of the relatively high pressure.

8. The system of claim 1 further comprising a sealing member disposed between two facing surfaces of the sleeve and the rotary ring to maintain a sealing contact between the sleeve and the rotary ring.

9. The system of claim 1 wherein the pusher is a disc that extends around the sleeve in a coaxial relation thereto, the disc having an inner radial flange that engages an outer radial flange on the sleeve.

10. A sealing system for a shaft comprising:

a stationary sealing ring extending around the shaft in a coaxial relationship to the shaft a rotary sealing ring extending around the shaft in a coaxial relationship to the shaft and adapted to rotate with the shaft;

a housing;

a sleeve disposed between the stationary sealing ring and the housing;

a pusher disposed between the sleeve and the housing;

biasing means urging the pusher away from the housing and against the sleeve to urge the sleeve against the stationary ring and to urge the stationary ring against the rotary ring so that facing surfaces of the rings engage to form a primary seal between the rings to substantially prevent fluid flow across the primary seal from a relatively high pressure radial side to a relatively low pressure radial side;

a first sealing member disposed between two facing surfaces of the housing and the sleeve to maintain a sealing contact between the housing and the sleeve; and a second sealing member disposed between two facing surfaces of the sleeve and the rotary ring to maintain a sealing contact between the sleeve and the rotary ring.

11. The system of claim 10 wherein the geometry and the relative dimensions of the housing and the sleeve are such that the sleeve is adapted to maintain the gap between it and the housing despite the presence of relatively high pressure at the high pressure radial side.

12. The system of claim 10 wherein the first sealing member is disposed in a channel in the sleeve.

13. The system of claim 10 wherein the first sealing member is disposed in a channel in the housing.

14. The system of claim 10 wherein the sleeve and the housing are fabricated of the same material.

15. A shaft according to claim 10 wherein the sleeve engages the stationary ring.

16. The system of claim 10 wherein the sleeve has a lip that engages the stationary ring and flexes in response to the presence of the relatively high pressure.

17. The sealing system of claim 10 wherein a gap is formed between the two facing surfaces of the housing and the sleeve and in a spaced relation to the first sealing member to maintain the gap despite the presence of relatively high pressure at the high pressure radial side.

18. The system of claim 10 wherein the pusher is a disc that extends around the sleeve in a coaxial relation thereto, the disc having an inner radial flange that engages an outer radial flange on the sleeve.

19. A sealing system for a shaft comprising:

a stationary sealing ring extending around the shaft in a coaxial relationship to the shaft;

a rotary sealing ring extending around the shaft in a coaxial relationship to the shaft;

a housing;

a sleeve disposed between the stationary ring and the housing and having an outer radial flange;

a pusher disc extending around the sleeve in a coaxial relation thereto and having an inner radial flange that engages the outer radial flange on the sleeve;

biasing means urging the pusher disc, and therefore the sleeve, away from the housing and the sleeve against the stationary ring so that facing surfaces of the rings engage to form a primary seal between the rings to substantially prevent fluid flow across the primary seal from a relatively high pressure radial side to a relatively low pressure radial side; and a sealing member disposed between two facing surfaces of the sleeve and the stationary ring to maintain a sealing contact between the sleeve and the stationary ring.

20. The system of claim 19 wherein the sealing member is disposed in a channel of the sleeve that extends through the surface of the sleeve.

21. The system of claim 19 wherein the sealing member is disposed in a channel in the housing that extends through the surface of the housing.

22. The system of claim 19 wherein the geometry and the relative dimensions of the housing and the sleeve are such that the sleeve is adapted to maintain a gap between it and the housing despite the presence of relatively high pressure at the high pressure radial side.

23. The system of claim 19 wherein the sleeve and the housing are fabricated of the same material.

24. The system of claim 19 wherein the sleeve engages the stationary ring.

25. The system of claim 19 wherein the sleeve has a lip that engages the stationary ring and flexes in response to the presence of the relatively high pressure.

26. A sealing system for a shaft comprising:

a stationary sealing ring extending around the shaft in a coaxial relationship to the shaft;

a rotary sealing ring extending around the shaft in a coaxial relationship to the shaft;

a housing;

a sleeve disposed between the sealing element and the housing and having an outer radial flange, the sleeve having a lip that engages the rotary ring and flexes in response to the presence of the relatively high pressure;

a pusher disc extending around the sleeve in a coaxial relation thereto and having an inner radial flange that engages an outer radial flange on the sleeve;

biasing means urging the pusher disc, and therefore the sleeve, away from the housing and the sleeve against the rotating ring so that facing surfaces of the rings engage to form a primary seal between the rings to substantially prevent fluid flow across the primary seal from a relatively high pressure radial side to a relatively low pressure radial side.

* * * * *